(12) United States Patent
Vickery

(10) Patent No.: US 9,089,811 B2
(45) Date of Patent: Jul. 28, 2015

(54) COAXIAL / COAXIAL TREATMENT MODULE

(75) Inventor: Earl Vickery, Oklahoma City, OK (US)

(73) Assignee: Highvac Corp., Colorado Springs, CO (US)

( * ) Notice: Subject to any disclaimer, the term of this patent is extended or adjusted under 35 U.S.C. 154(b) by 500 days.

(21) Appl. No.: 13/459,682

(22) Filed: Apr. 30, 2012

(65) Prior Publication Data

US 2013/0287637 A1  Oct. 31, 2013

(51) Int. Cl.
| | |
|---|---|
| *B01D 53/74* | (2006.01) |
| *B01D 53/14* | (2006.01) |
| *B01D 53/18* | (2006.01) |
| *B01D 53/76* | (2006.01) |

(52) U.S. Cl.
CPC .............. *B01D 53/14* (2013.01); *B01D 53/18* (2013.01); *B01D 53/76* (2013.01); *B01D 2251/102* (2013.01); *B01D 2251/11* (2013.01); *B01D 2252/103* (2013.01); *B01D 2257/553* (2013.01); *B01D 2258/0216* (2013.01)

(58) Field of Classification Search
CPC ........ B01D 53/14; B01D 53/18; B01D 53/76; B01D 2251/11; B01D 2251/102; B01D 2252/103; B01D 2257/553; B01D 2258/0216
USPC ......................................... 422/168, 169, 182
See application file for complete search history.

(56) References Cited

U.S. PATENT DOCUMENTS

| | | | |
|---|---|---|---|
| 3,997,299 A | 12/1976 | Von Linde et al. | |
| 4,801,437 A | 1/1989 | Konagaya et al. | |
| 4,815,966 A | 3/1989 | Janssen | |
| 5,123,836 A * | 6/1992 | Yoneda et al. | 431/5 |
| 5,900,217 A * | 5/1999 | Hartung et al. | 422/171 |
| 5,957,678 A * | 9/1999 | Endoh et al. | 431/353 |
| 6,089,859 A | 7/2000 | Greiner et al. | |
| 6,234,787 B1 * | 5/2001 | Endoh et al. | 422/168 |
| 7,569,193 B2 | 8/2009 | Ferron et al. | |
| 7,618,595 B2 | 11/2009 | Hartung et al. | |
| 2007/0086931 A1 | 4/2007 | Raoux et al. | |
| 2007/0274876 A1 | 11/2007 | Chiu et al. | |

\* cited by examiner

*Primary Examiner* — Jill Warden
*Assistant Examiner* — Joye L Woodard
(74) *Attorney, Agent, or Firm* — Molly D. McKay

(57) ABSTRACT

A treatment module for use in an abatement system for process exhaust gases. The treatment module has a centrally located flame wall oxidizer module that cause the process exhaust gases to travel within a cylinder of gas a short distance upon exiting the exhaust conduit before the gases are oxidized. Following oxidation, two coaxial cylinders of water spray flush solid, liquid and water soluble components of the oxidation products from the resulting oxidation products stream into a bottom water reservoir. The first inner water spray cylinder coaxially surrounds the flame wall oxidizer module and flows co-currently with the downward flow of oxidation products. The gaseous oxidation products then turn 180 degrees and pass upward through a second outer water spray cylinder located coaxial to and surrounding the first water spray. Thereafter, the remaining water insoluble gaseous oxidation products exit the treatment module.

7 Claims, 4 Drawing Sheets

COAXIAL / COAXIAL TREATMENT MODULE

BACKGROUND OF THE INVENTION

1. Field of the Invention

The present invention is a treatment module for use in treatment of metastable compounds such as those produced by the semi-conductor industry.

2. Description of the Related Art

Industrial processes such as those used in fabricating semiconductor devices require the use of many gases and vapors that are dangerous to life and health. Many are also flammable or pyrophoric in nature. High concentrations of these gases can be found in the exhaust streams of various pieces of process equipment and must be removed from the exhaust stream prior to the release into the environment.

Equipment known as process gas abatement systems are generally used to further the process these exhaust gas streams to make them safe for release. These often use incineration, solid chemical reactants, water absorption, catalytic oxidation, and other unit processes to accomplish the goal. There are many abatement systems available from a wide range of suppliers around the world and many of these are "purpose built" to abate only specific gases while others are point-of-use abatement system based on modules that can be assembled together with ease when re-purposing is needed.

The present invention is a treatment module for use in such an abatement system. The treatment module is designed to cause the process exhaust gases to be oxidized in a flame wall oxidizer module. Within a flame wall oxidizer module, the process exhaust gases travel within a cylinder of gas to prevent the solid reactions products that are formed by the oxidation of many process gases from depositing on the inner walls of the exhaust conduit, thus minimizing the need for routine maintenance required by many of the existing systems. The details of this type of flame wall oxidizer module are described more fully in Applicant's co-pending U.S. patent application Ser. No. 13/246,222.

Further, the treatment module of the present invention then provides for water treatment of the resulting oxidation products by passing those products through two coaxial cylinders of water spray. The oxidation products first pass downward through a first water spray cylinder that coaxially surrounds and is of a co-current flow direction with the flow of oxidation products. Then the gaseous oxidation products turn at a 180 degree angle and pass outward and upward through a second water spray cylinder that is coaxial to and surrounds the first water spray cylinder.

The water sprays from the two water spray cylinders flush solid, liquid and water-soluble gaseous segments of the oxidation products downward into a water reservoir located in the bottom of the treatment module. Those oxidation products that enter into the water reservoir can then be periodically flushed from the treatment module.

The remaining water insoluble gaseous oxidation products pass through both water spray cylinders and exit the treatment module in which case they either undergo further treatment or are exhausted, depending on the process and the oxidation products produced.

SUMMARY OF THE INVENTION

The present invention is a treatment module for use in an abatement system for process exhaust gases. The treatment module is initially provided with a flame wall oxidizer module that is designed to cause the process exhaust gases to travel within a cylinder of gas upon exiting the exhaust conduit. This prevents the exhaust gases from encountering air that will oxidize them to form solid reactions products until the process gases are far enough away from the exhaust conduit that they do not deposit solid reaction products on the inner walls of the exhaust conduit.

After the exhaust gases have exited the exhaust conduit and travelled a short distance contained within the surrounding cylinder of gas, air penetrates the cylinder of gas, reaches the exhaust gases and oxidizes them.

Following oxidation, the treatment module is provided with two coaxial cylinders of water spray to remove the solid oxidation products from the resulting oxidation products stream. The oxidation products stream first passes downward through a first water spray cylinder that coaxially surrounds and is of a co-current flow direction with the flow of oxidation products. Then the gaseous oxidation products turn 180 degrees and pass outward and upward through a second water spray cylinder that is coaxial to and surrounds the first water spray cylinder.

The water sprays from the two water spray cylinders flush solid, liquid and water-soluble gaseous segments of the oxidation products downward into a water reservoir located in the bottom of the treatment module. Those oxidation products that enter into the water reservoir can then be periodically flushed from the treatment module while the remaining water insoluble gaseous oxidation products exit out the top of the treatment module.

DETAILED DESCRIPTION OF THE PREFERRED EMBODIMENT

Figure 9:
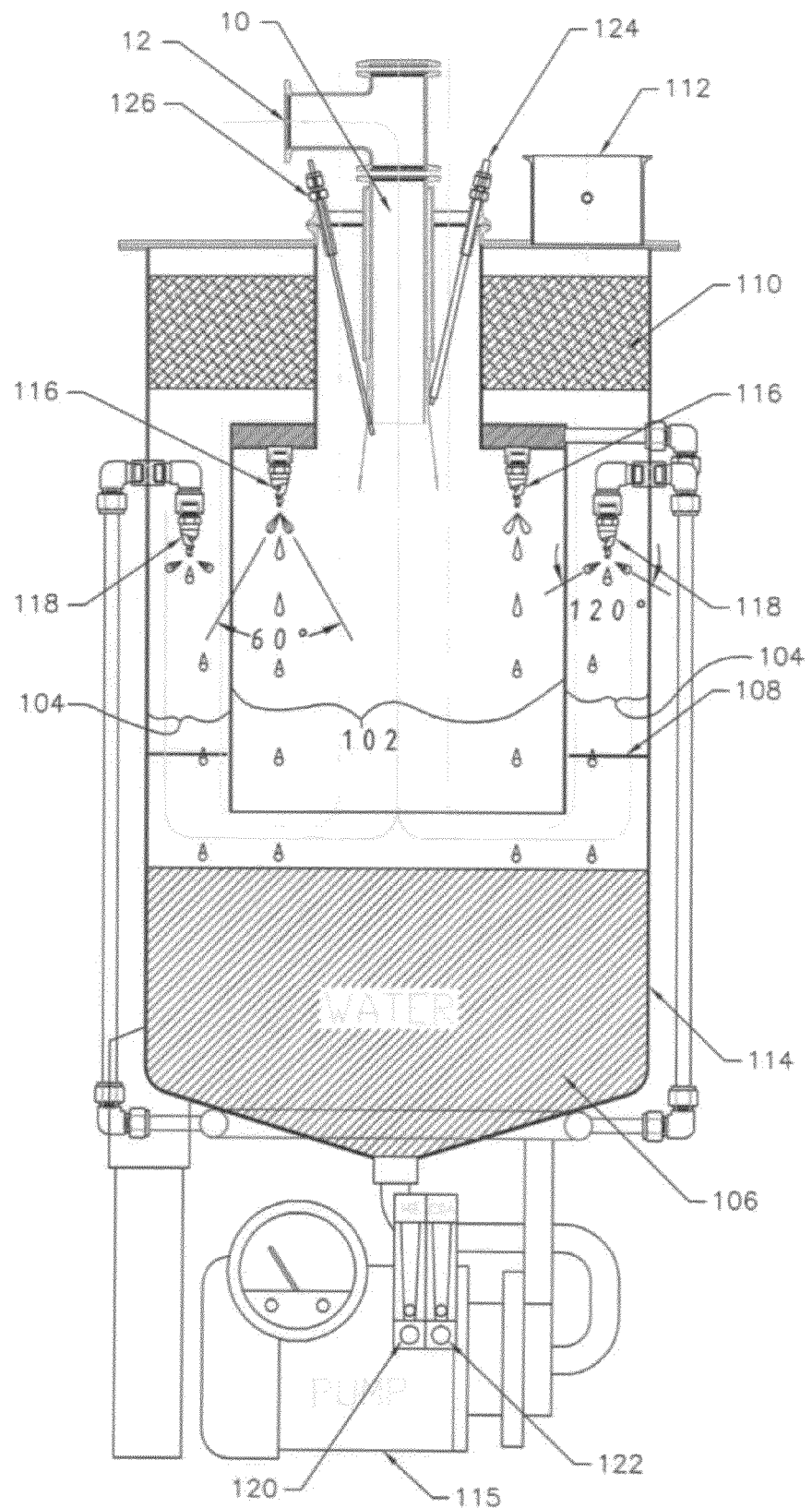
FIG. 9 is a diagram of a coaxial/coaxial treatment module constructed in accordance with a preferred embodiment of the present invention.

Referring now to the FIG. 9, there is illustrated a treatment module 100 for use in an abatement system for process exhaust gases. The treatment module 100 is initially provided with a flame wall oxidizer module 10 that is designed to cause the process exhaust gases to travel within a cylinder of gas 20 upon exiting the exhaust conduit 12. This prevents the exhaust gases from encountering air that will oxidize them to form solid reactions products until the process gases are far enough away from the exhaust conduit 12 that they do not deposit solid reaction products on the inner walls of the exhaust conduit 12. The details of the flame wall oxidizer module 10 will be discussed hereafter.

After the exhaust gases have exited the exhaust conduit 12 and travelled a short distance contained within the surrounding cylinder of gas 20, air penetrates the cylinder of gas 20, reaches the exhaust gases and oxidizes them.

Following oxidation, the treatment module 100 is provided with two coaxial cylinders of water spray 102 and 104 surrounding the centrally located flame wall oxidizer module 10. The cylinders of water spray 102 and 104 remove the solid oxidation products from the oxidation products stream exiting the flame wall oxidizer module 10.

The oxidation products stream first passes downward through a first inner water spray cylinder 102 that coaxially surrounds and is of a co-current flow direction with the flow of oxidation products. The water from the first inner water spray cylinder falls under the influence of gravity downward to a water reservoir 106 located at the bottom of the treatment module 100.

The gaseous oxidation products travel downward within the first inner water spray cylinder 102 and then turn 180 degrees and pass outward and upward through a second outer water spray cylinder 104 that is coaxial to and surrounds the first inner water spray cylinder 102. A perforated plate 108 is provided within the second outer water spray cylinder 102 to provide increase contact between the gaseous oxidation products and the water. As the gaseous oxidation products travel upward countercurrent to the flow of water spray within the second outer water spray cylinder 104, the water spray removes remaining solid oxidation products from the oxidation products stream. The water washed gaseous oxidation products then pass through a demister 110 that coalesces entrained water droplets and removes them from the gases. The exhaust gases then exit the treatment module 100 via an exit 112 provided in a containment vessel 114 that surrounds the other components 10, 102, 104, 106, 108, and 110 of the treatment module 100.

The water sprays from the two water spray cylinders 102 and 104 flush solid, liquid and water-soluble gaseous components of the oxidation products downward into the water reservoir 106 located in the bottom of the treatment module 100. Those oxidation products that enter into the water reservoir 106 can then be periodically flushed from the treatment module 100 while the remaining water insoluble gaseous oxidation products exit out the top of the treatment module 100.

As shown in FIG. 9, the treatment module 100 is provided with a water pump 115 that recirculates water from the water reservoir 106 and supplies water to water misting nozzles 116 located within the inner coaxial cylinder of water spray 102 and to water misting nozzles 118 located within the outer coaxial cylinder of water spray 104.

Details of the flame wall oxidizer module 10 will now be discussed with reference to FIGS. 1-8. It should be noted that FIGS. 1-8 are provided to illustrate the flame wall oxidizer module 10 and are shown in relationship to a containment structure 18 that is not part of the present invention 100.

Figure 1:
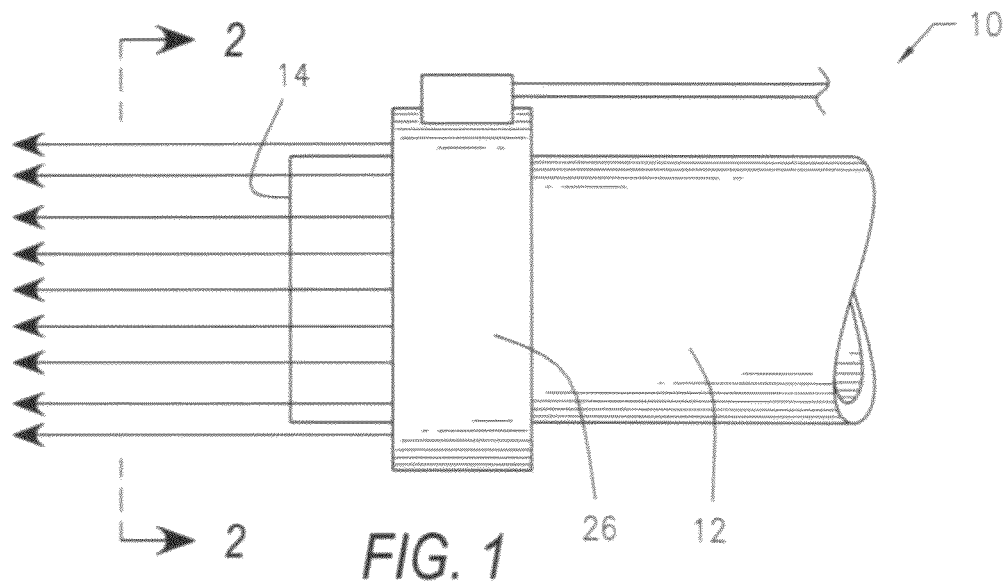
FIG. 1 is side view of a flame wall oxidizer module that is employed in the coaxial/coaxial treatment module of FIG. 9.
Figures 2, 3:
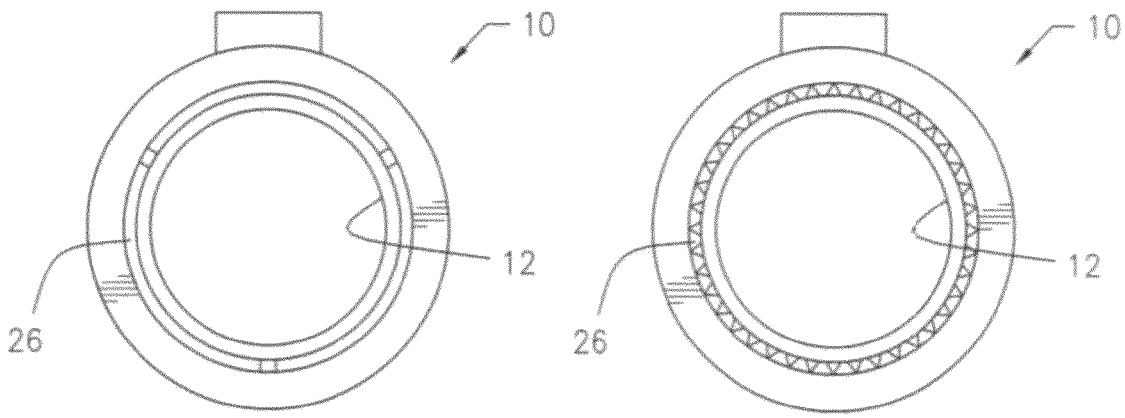
FIG. 2 is a front view of a first variation or embodiment of the fuel ring surrounding the process gas conduit taken along line 2-2 of FIG. 1.
FIG. 3 is a front view of a second variation or embodiment of the fuel ring surrounding the process gas conduit.
Figure 4:
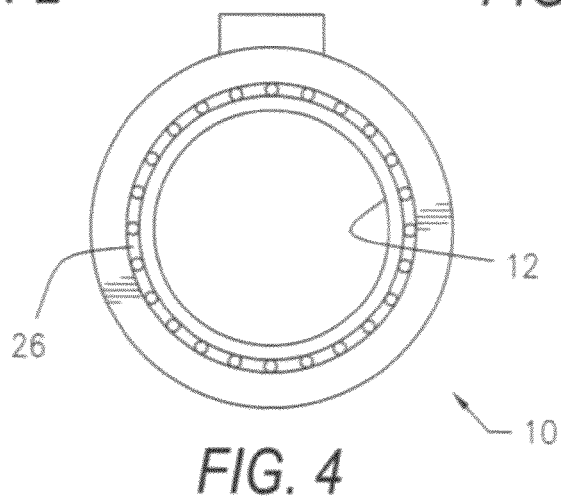
FIG. 4 is a front view of a third variation or embodiment of the fuel ring surrounding the process gas conduit.
Figure 5:
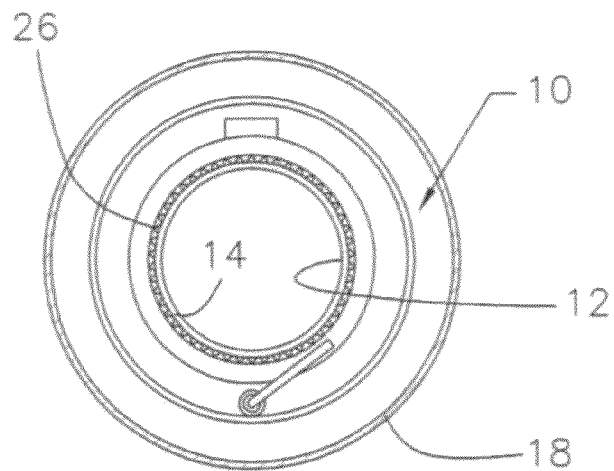
FIG. 5 is a front view of the second variation of the fuel ring that is shown in FIG. 3.

Referring initially to FIG. 1, there is illustrated a flame wall oxidizer Module 10. The module 10 consists of a waste process gas conduit 12 that has its exit or terminal end 14 surrounded by a fuel ring 26 that produces a cylinder 20 of protective gases around the stream of waste process gases that flow out of the end 14 of the waste process gas conduit 12. The module 10 is surrounded by a containment structure 18 that is typical of the prior art and therefore will not be described further. The fuel ring 26 may be of a variety of configurations, as illustrated in FIGS. 2-5, with each having the fuel ring 26 surrounding the exit end 14 of the waste process gas conduit 12.

Figure 6:
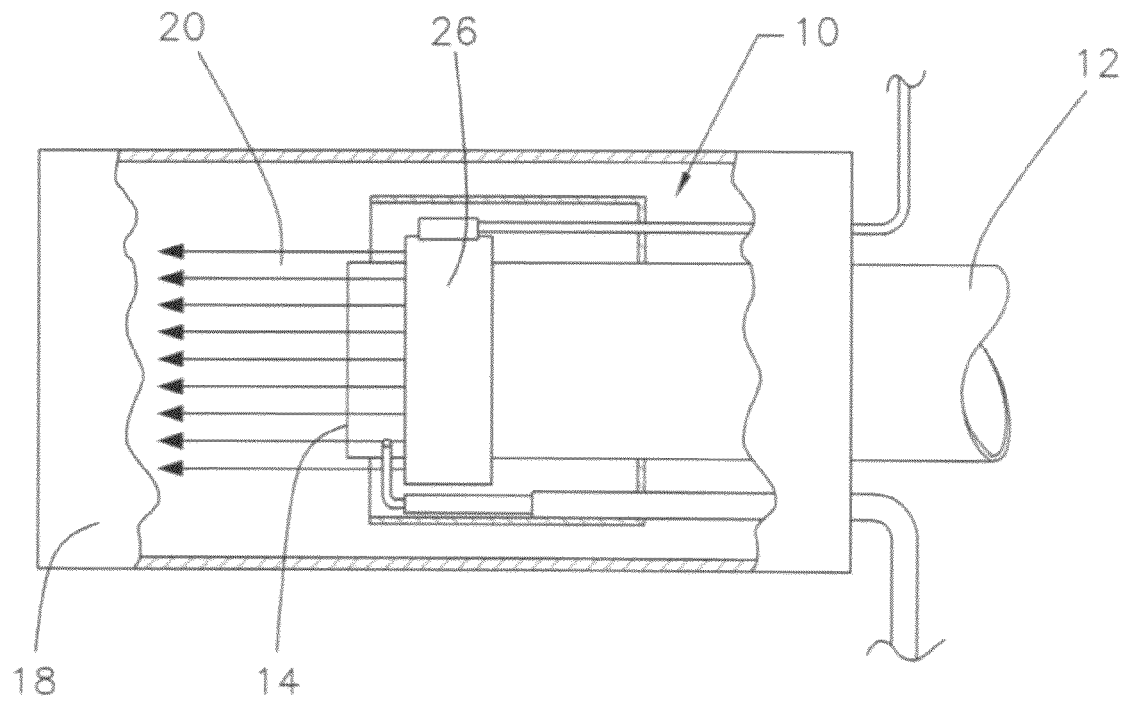
FIG. 6 is a side view of a flame wall oxidizer module showing a flame cylinder emanating from the fuel ring surrounding the process gas conduit.
Figure 7:
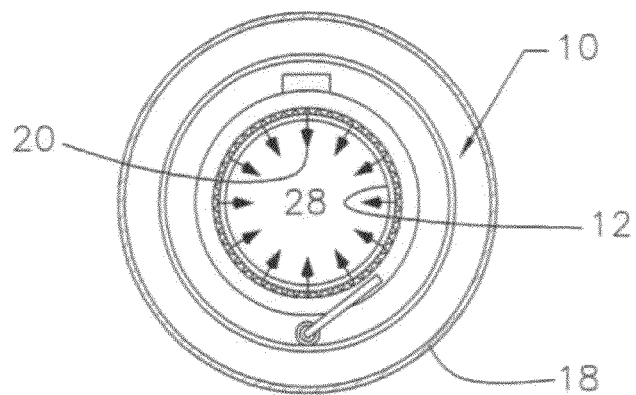
FIG. 7 is a front view of the flame wall oxidizer module showing the flame cylinder surrounding the process gas conduit.

Referring now to FIG. 6, the module 10 is shown with the flame cylinder 20 visible as it emanates from the fuel ring 26. FIG. 7 shows the hollow interior area 28 of the flame cylinder 20 where the exit end 14 of the waste process gas conduit 12 is located.

Figure 8:
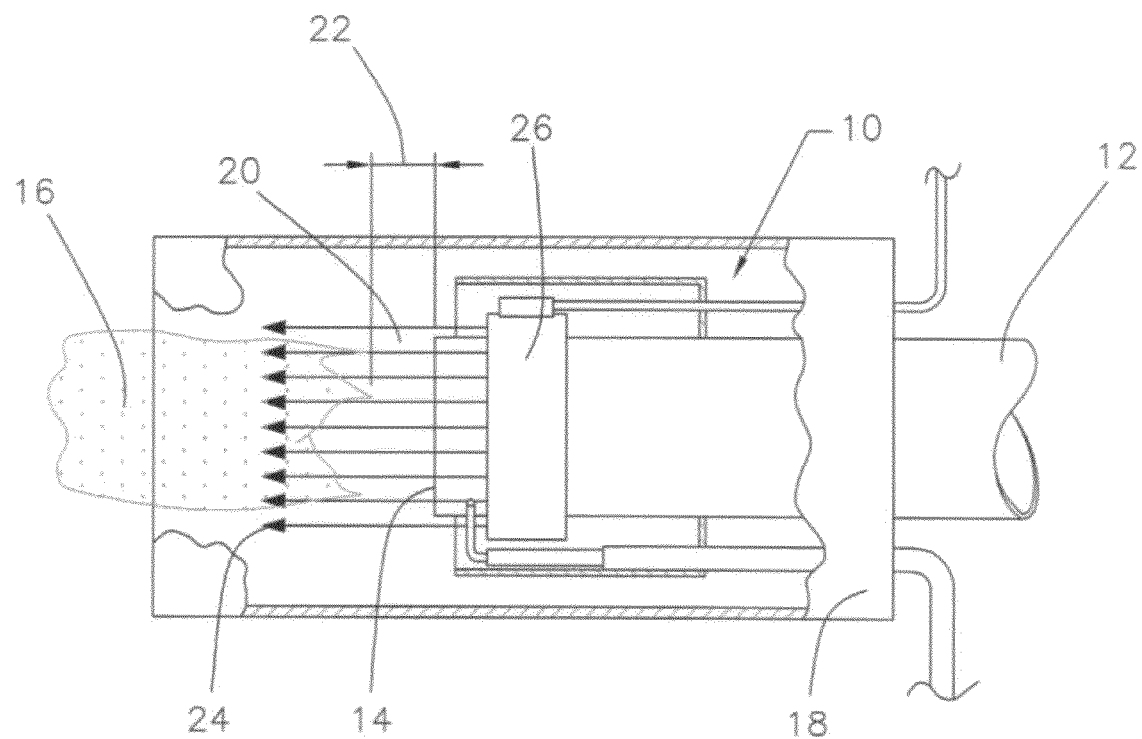
FIG. 8 is a side view of the flame wall oxidizer module of FIG. 6 showing waste production gases being oxidized by the module and illustrating the region of little or no oxidation located adjacent to the exit end of the process gas conduit.

FIG. 8 shows the module 10 of FIG. 6 with the waste process gas being fed to the module 10 and being oxidized in the oxidation area 16 as it encounters oxidizer gas. The oxidation area 16 appears as a yellow flame in FIG. 8.

The module 10 produces an oxidation area 16 which is a region where the temperature is high enough to initiate and sustain the desired reactions of the process gases with an oxidizer gas such as oxygen or compressed dry air (CDA). This oxidation area 16 is located in an area where the process gases encounter oxygen and after the process gases have moved away from the end 14 of the conduit 12 that might be coated by solid reaction products. The process gases are also contained within containment walls created from the cylinder 20 of dynamic gas regions that prevent these waste process gases from contacting an oxidizer until no solid surfaces, such as the walls of the containment structures 18 are near enough for solid reaction products to collect on them as deposits. The cylinder 20 of protective gases is created by one of two ways: either by an active flame or by heated inert gas. For purposes of illustration, only an active flame cylinder 20 is shown in the accompanying figures. The waste process gas stream is then passed through the hollow center area 28 of the protective gas cylinder 20. When an active flame cylinder 20 is used, oxygen or oxidizer gas in the surrounding air is consumed by the burning fuel gas within the cylinder 20, leaving little or no oxygen or oxidizer gas available for the process gases to react with to oxidize the process gases.

The greatly increased temperature produced by the burning fuel gas within the cylinder 20 also forms a barrier to oxygen diffusion through the walls of the cylinder 20 to the oxygen depleted region 22 that is located within the cylinder 20 and adjacent to the end 14 of the conduit 12.

Examples of fuel gases that can be used to produce the active flame cylinder 20 are, but are not limited to, hydrogen, methane, propane, ethane, butane, natural gas, acetylene, and MAPP®. MAPP® gas is a fuel gas based on a stabilized mixture of methylacetylene (propyne) and propadiene.

When a heated inert gas is used instead of a fuel gas and oxygen mixture to create the cylinder 20, no oxygen is available in the first place in the oxygen depleted region 22 and the increased temperature prevents oxygen transport across the inert gas barrier in the same way as with the active flame method.

Examples of inert gases that may be used to create the heated inert gas cylinder 20 are, but are not limited to, nitrogen, argon, helium and carbon dioxide. The process gases enter the oxygen depleted region 22 and are heated to reaction temperatures by way of thermal transfer from the heated inert gas cylinder 20. As the process gases proceed down to the end 24 of the heated gas cylinder 20, they enter the oxidation area 16 where they encounter air that contains oxygen and where reaction or "oxidation" of the process gases occurs with the oxygen in the air. The oxidizer poor or oxygen depleted region 22 extends at least 0.1 mm from the closest solid surface exposed to possible depositions which is generally the end 14 of the conduit 12. This oxidizer poor region 22 is shown in FIG. 8.

Another feature of this novel oxidizer module 10 is that it can be configured to eliminate some deposits formed as a result of pyrolytically decomposing or "cracking" certain compounds as they proceed toward the end 14 of the conduit 12 and before they enter the heated gas cylinder 20 where temperatures high enough may allow decomposing to begin. These compounds include, but are not limited to, phosphine ($PH_3$) and arsine ($AsH_3$). These materials may deposit phosphorus (P) and arsenic (As) metals, respectively, in the terminal end 14 of the conduit 12. To eliminate this, the terminal end 14 of the oxidizer conduit 12 can be heated simply by increasing the rate of fuel gas oxidation by adding more air or oxygen to the fuel gas stream mixture. While this does not change the quantity of heat produced, it causes a hotter region as the fuel gas leaves its injection points on the fuel ring 26 and thereby heats the end 14 of the conduit 12. This will increase the temperature of the underlying conduit 12 and can be set to a temperature above the 614° C. boiling point of both arsenic and above the 280.5° C. boiling point of phosphorus. These conditions will prevent any deposits from occurring on the heated surfaces of the end 14 of the conduit 12. Temperature or the conduit 12 can range from 90° C. to 1,600° C.

Another example of how controlling the temperature of the end 14 of the conduit 12 can prevent undesirable deposits is when the gas stream contains Silane ($SiH_4$). This compound is routinely used in the manufacture of solid state products as a source of the element silicon (Si). Silane pyrolytically decomposes starting at 800° C. and will coat a surface at or above this temperature with Silicon. Because Silicon does not boil below 2,355° C., it is not practical to remove these deposits by boiling, therefore, fuel gas without added air or oxygen will keep the surface temperature of the end 14 if the conduit 12 below 800° C. and no silicon will deposit on the surfaces of the conduit 12.

Many materials can be used for the construction of the fuel ring 26. Practical choices are, but are not limited to, mild steel, brass, black iron, aluminized steel, zincated steel, and any of the stainless steel alloys.

The waste process gas conduit 12 can be constructed of any practical material that is suitable for the application being considered. Examples are, but are not limited to, ceramics, black iron, steel, stainless steel alloys including the following brands: Hastaloy®, Kovar®, Inconel® and Monel®.

Waste process gas conduits 12 can be as small as 0.004" in diameter up to a maximum of 12" in diameter. Larger diameters allow too much back diffusion of uncontrolled gas to be effective. The length of the conduit 12 that is to be heated to boil off or evaporate unwanted deposits ranges from 0.004" to a maximum length of 8".

As illustrated in FIG. 9, the flame wall oxidizer module 10 is supplied with fuel gas via a fuel flow meter 120 and supplied with an oxidizing gas via an oxidizer flow meter 122. Also, shown associated with the flame wall oxidizer are an igniter 124 and a thermocouple 126. The igniter 124 provides a spark to ignite the fuel gas and the thermocouple 126 provides an indication that the fuel gas has ignited.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A treatment module for use in an abatement system for process exhaust gases comprising:
    a containment vessel containing a flame wall oxidizer module, said flame wall oxidizer module provided with a waste process gas conduit with an open terminal end that is surrounded by a fuel ring capable of emitting a cylinder of fuel gas around the open terminal end of the waste process gas conduit, said open terminal end of said waste process gas conduit extending beyond the fuel ring and the fuel ring oriented so that process exhaust gases that exit the open terminal end of the waste process gas conduit are surrounded by the cylinder of fuel gas exiting the fuel ring and the exhaust gases travel within the cylinder of fuel gas a short distance before they oxidize to form an oxidation products stream,
    an inner coaxial cylinder surrounding the flame wall oxidizer module, water spray nozzles provided in said inner coaxial cylinder and oriented so that they spray water in a direction concurrent with the oxidation products stream that exits from the flame wall oxidizer module,
    an outer coaxial cylinder surrounding the inner coaxial cylinder, and water spray nozzles provided in said outer coaxial cylinder and oriented so that they spray water in a direction counter-current to the oxidation products stream that reversed its direction of flow after exiting the inner coaxial cylinder.

2. A treatment module for use in an abatement system for process exhaust gases according to claim 1 further comprising:
    a bottom water reservoir provided within the containment vessel for receiving water from the two coaxial cylinders provided with water spray nozzles.

3. A treatment module for use in an abatement system for process exhaust gases according to claim 2 further comprising:
    an exit provided in the containment vessel for exhausting treated exhaust gases.

4. A treatment module for use in an abatement system for process exhaust gases according to claim 3 further comprising:
    a perforated plate provided within the outer coaxial cylinder to increase contact between the exhaust gases and the water spray emanating from the spray nozzles located within the outer coaxial cylinder.

5. A treatment module for use in an abatement system for process exhaust gases according to claim 4 further comprising:
    a demister provided between the outer coaxial cylinder and the exit to remove water particles from the exhaust gases.

6. A treatment module for use in an abatement system for process exhaust gases according to claim 5 further comprising:
    a water pump supplying water to said water spray nozzles located within the inner and outer coaxial cylinders.

7. A treatment module for use in an abatement system for process exhaust gases according to claim 6 further comprising:
    flow meters for supplying fuel gas and oxidizer gas to said flame wall oxidizer module.

* * * * *